(12) United States Patent
Drummond

(10) Patent No.: US 6,183,650 B1
(45) Date of Patent: Feb. 6, 2001

(54) SYNTHETIC MINERAL MICROPARTICLES AND RETENTION AID AND WATER TREATMENT SYSTEMS AND METHODS USING SUCH PARTICLES

(75) Inventor: Donald Kendall Drummond, Glenmoore, PA (US)

(73) Assignee: Minerals Technologies Inc., Bethlehem, PA (US)

(*) Notice: Under 35 U.S.C. 154(b), the term of this patent shall be extended for 0 days.

(21) Appl. No.: 09/417,320

(22) Filed: Oct. 13, 1999

Related U.S. Application Data

(62) Division of application No. 09/072,638, filed on May 4, 1998, now Pat. No. 5,989,714.

(51) Int. Cl.[7] ........................................... C02F 1/56
(52) U.S. Cl. ..................... 210/716; 210/727; 210/928
(58) Field of Search ..................... 210/702, 716, 210/717, 725, 727, 728, 665–667, 928; 252/179; 423/277, 279, 306, 330.1, 333; 428/402

(56) References Cited

U.S. PATENT DOCUMENTS

| | | | |
|---|---|---|---|
| 1,499,492 | | 7/1924 | Wilcox .............................. 423/330.1 |
| 1,656,604 | | 1/1928 | Partridge et al. ................. 423/330.1 |
| 2,970,889 | | 2/1961 | Tshino et al. ..................... 423/330.1 |
| 3,300,406 | * | 1/1967 | Pollio ................................... 210/728 |
| 3,514,268 | | 5/1970 | Uoda et al. ....................... 423/330.1 |
| 3,784,442 | | 1/1974 | Hackbarth et al. .................. 162/162 |
| 3,909,406 | * | 9/1975 | Lang .................................... 210/716 |
| 4,213,874 | | 7/1980 | Williams et al. .................... 252/179 |
| 4,279,756 | * | 7/1981 | Weiss et al. ......................... 210/667 |
| 4,329,328 | | 5/1982 | McAnespie et al. ................ 423/333 |
| 4,404,105 | * | 9/1983 | de Lockerente et al. ........... 210/710 |
| 4,566,986 | * | 1/1986 | Waldmann ............................ 252/175 |
| 4,749,444 | | 6/1988 | Lorz et al. ......................... 162/168.3 |
| 4,830,843 | | 5/1989 | Usui et al. ............................ 423/331 |
| 4,891,197 | | 1/1990 | Derouane et al. ................... 423/279 |
| 4,981,675 | * | 1/1991 | Haase et al. ......................... 423/556 |
| 5,032,227 | | 7/1991 | Derrick et al. .................... 162/168.1 |
| 5,053,139 | * | 10/1991 | Dodwell et al. ...................... 210/688 |
| 5,279,807 | | 1/1994 | Moffett et al. ....................... 423/338 |
| 5,294,352 | * | 3/1994 | Waldmann ............................ 210/725 |
| 5,454,955 | * | 10/1995 | Albrecht et al. ..................... 210/705 |
| 5,456,829 | * | 10/1995 | Brown .................................. 210/194 |
| 5,681,475 | * | 10/1997 | Lamensdorf et al. ............... 210/666 |
| 5,830,388 | * | 11/1998 | Kigel et al. .......................... 252/358 |
| 5,938,970 | * | 8/1999 | Reilly et al. ......................... 252/175 |

FOREIGN PATENT DOCUMENTS

WO92/04091    5/1991   (WO).

OTHER PUBLICATIONS

D.S. Honig et al, "Formation Improvements with Water Soluble Micropolymer System," Tappi Jour. vol. 76, No. 9 (Sep. 1993)pp. 135–143.

Mellor, "A Comprehensive Treatise on Inorganic and Theoretical Chemistry," Longmans; Green & co., London (1947), vol. VI, pp. 440–441 [QD 31–M4 1947].

* cited by examiner

*Primary Examiner*—Peter A. Hruskoci
(74) *Attorney, Agent, or Firm*—Marvin J. Powell; Terry B. Morris

(57) ABSTRACT

A composition comprising the product precipitated in the admixing of a soluble metal salt and one or more compounds having a component selected from silicates, phosphates and borates; and a method for controlling drainage and/or retention in the formation of a paper matrix or for treating water comprising the use of such product.

2 Claims, No Drawings

SYNTHETIC MINERAL MICROPARTICLES AND RETENTION AID AND WATER TREATMENT SYSTEMS AND METHODS USING SUCH PARTICLES

This is a Division of Ser. No. 09/072,638, filed May 4, 1998, now U.S. Pat. No. 5,989,714.

FIELD OF THE INVENTION

This invention relates to synthetic mineral microparticles, specifically metallic microparticles. This invention additionally relates to the production of such synthetic mineral microparticles, particularly to precipitation production of such microparticles by mixing metal salts and materials having precursor compounds.

This invention further relates to the use of both the synthetic mineral microparticles in water treating systems and the method of using such synthetic mineral microparticles in retention aid systems in paper-making systems.

BACKGROUND OF THE INVENTION

Traditional paper-making systems include the provision of a water-based slurry, termed a "paper furnish", containing wood fibers, fines, and other ingredients to a moving web on a paper machine to facilitate the formation of a paper matrix, which is drained, dried and pressed into a final paper sheet product. A desire in such a process is to drain the excess water in an efficient manner to form a heterogeneous matrix without also unnecessarily removing desired fibers, fines and other solids. Retained undesired water burdens the downstream processes, such as, for example, a wet sheet in the dryer section. However, removal of desired solids endangers acceptability of the final paper sheet. Also, the act of draining water can adversely affect sheet formation.

Retention aid systems have been developed to increase retention of desired fibers, fines and solids, to improve paper sheet formation, and to drain better the paper matrix in the paper sheet forming section of paper machines. Such systems benefit, in part, the papermaker by allowing the paper machine to run more cleanly while producing a better sheet at higher machine speeds. Among the retention aid systems are those which utilize natural and synthetic microparticle systems. Certain of these retention aids include colloidal aluminum hydroxide, colloidal magnesium silicate, bentonite, colloidal silica, and organic polymer based systems.

Depending upon cost, quality, customer requirements and other considerations, the papermaker may employ a number of differing strategies of retention aid use. One typical strategy is to add an agglomerating agent to a thin stock precursor to the paper furnish. Such agent acts to agglomerate or flocculate the fibers, fines and solids. Typical agents are starch and/or polymers. However, such systems often subsequently subject the agglomerated material to a shearing force in screening equipment to produce smaller agglomerates with an intended purpose to obtain better sheet formation. A retention aid to help retain the fiber, fines and other desired solids can be added to the system before the furnish is passed through the paper machine head box to begin the paper matrix formation on the paper machine web. This retention aid causes a second agglomeration differing from the previous agglomeration.

Such aids have varying degrees of effectiveness due to the numerous variables in the paper-making process. One strategy is to formulate in a remote production facility various aids having a variety of relative percentages of the components. These differing percentages in the retention aid's composition are intended to match the requirements of the furnish for overall system performance. Such strategy often makes performance a result of art and happenstance rather than of engineered control. What are needed are better drainage aids and retention aids and methods of using such aids in the paper-making process.

Further, a system of agglomerating particles is sometimes useful in the treatment of water in trapping or otherwise removing undesired particles and oils or other globules from water. While many systems for water treatment exist based upon agglomeration principles, new and useful agglomerants are still desirable.

Accordingly, it is an object of the present invention to provide synthetic mineral microparticles, specifically metallic microparticles, which are new to the paper-making art and which provide equal or enhanced performance compared to present retention and drainage aids. It is a further object to provide a method for the production of such synthetic mineral microparticles.

Another object is to use the synthetic mineral microparticles in a novel method of production in paper-making systems by providing such particles as drainage and retention aids. In another aspect of the present invention, it is an object to provide a system of agglomeration useful in water treatment.

PRIOR RELATED ART

International Publication No. WO 92/20862 discloses a process for improving the production of paper and paper products by adding a cationic polymer and an amorphous metal silicate separately to the papermaking furnish with sufficient mixing between additions. The order of addition of these components is not critical, however, the preferred order of addition is to add the polymer prior to the last high shear point. Subsequently the amorphous metal silicate is added before feeding the resultant mixture to the headbox of a paper making machine without subjecting the mixture to any further substantial shear. Products produced according to the process of this invention are useful for increasing retention, drainage, and formation in the production of paper from pulp slurries.

U.S. Pat. No. 3,784,442 discloses the reaction of sodium silicate and aluminum sulfate in an aqueous medium. The resulting precipitate is subsequently filtered, washed and dried. Products produced according to the process of this invention are useful as pigments and moisture conditioners and are especially useful as rubber reinforcing materials and as a filler in papermaking.

U.S. Pat. No. 4,213,874 discloses a method for producing finely divided amorphous, precipitated alkali metal aluminosilicates having increased ion exchange properties. The products of the invention have base or ion exchange capacities equal to known crystalline zeolitic base exchanges or adsorbents and are useful as water softening and detergent additives.

SUMMARY OF THE INVENTION

The present invention provides a synthetic metallic microparticle composition comprising the product precipitated in the admixing of a soluble metal salt and one or more compounds having a component selected from silicates, phosphates and borates. The metal salts useable are selected from salts of metals in Group 2 of the Periodic Table (particularly beryllium, magnesium, calcium, strontium, and barium); the general transitional metals of Groups 3 through 12 (including lanthanides and the actinide elements); and various metals in Groups 13 through 17 (particularly aluminum, zinc, gallium, cadmium, germanium, indium, mercury, tin, thallium, antimony, lead, bismuth, and polonium). In one particular embodiment the silicate can be a silicate or an aluminosilicate, an aluminophosphatosilicate, or an aluminoboratosilicate.

In another aspect, the present invention achieves the production of the silicate by the reaction of a meta-silicate with a metal sale.

The present invention is also of a method for controlling drainage and retention in the formation of a paper matrix comprising the steps of admixing a soluble metal salt and one or more components selected from silicates, phosphates and borates, to form a reaction product; admixing the reaction product and a paper furnish to produce a modified paper furnish; retaining and draining a portion of the modified paper furnish on a paper machine wire to form a paper matrix; measuring the amount of such retaining and draining; and, on the basis of the measuring of the amount of retaining and draining, adjusting the amount of the soluble metal salt and/or the amount of the components selected from silicates, phosphates, and borates to effect a desired change in the amount of retaining and/or draining.

DETAILED DESCRIPTION OF THE INVENTION

One embodiment of the present invention is a composition comprising the product precipitated in the admixing of a soluble metal salt and one or more compounds having a component (i.e. moiety) selected from silicates, phosphates and borates. Preferably, the metal of the soluble metal salt is selected from (1) beryllium, magnesium, calcium, strontium, and barium; (2) the first transition series of scandium, titanium, vanadium, chromium, manganese, iron, cobalt, nickel, and copper; (3) the second transition series of yttrium, zirconium, niobium, molybdenum, technetium, ruthenium, rhodium, palladium, and silver; (4) lanthanides, which consist of lanthanum, cerium, praseodymium, neodymium, promethium, samarium, europium, gadolinium, terbium, dysprosium, holmium, erbium, thulium, ytterbium, and lutetium; (5) the third transition series of hafnium, tantalum, tungsten, rhenium, osmium, iridium, platinum, and gold; (6) the actinide elements of actinium, thorium, uranium, neptunium, plutonium, americium, curium, berkelium, californium, einsteinium, fermium, mendelevium, nobelium, and lawrencium; and (7) the elements of aluminum, zinc, gallium, cadmium, germanium, indium, mercury, tin, thallium, antimony, lead, bismuth and polonium.

Preferably, the product is represented by an empirical formula selected from the group consisting of $M(I)_w Al_x Si_y P_z O_{(0.5w+1.5x+2y+2.5z)}$;

$M(I)_w Al_x Si_y B_z O_{(0.5w+1.5x+2y+1.5z)}$;

$M(I)_w M(II)_x Si_z O_{(0.5w+x+2z)}$;

$M(I)_w M(II)_x Al_y Si_z O_{(0.5w+x+1.5y+2z)}$;

$M(I)_w M(II)_x Si_y P_z O_{(0.5w+x+2y+2.5z)}$;

$M(I)_w M(II)_x Si_y B_z O_{(0.5w+x+2y+1.5z)}$;

$M(I)_w M(III)_x Si_z O_{(0.5w+0.5ax+2z)}$;

$M(I)_w M(III)_x Al_y Si_z O_{(0.5w+0.5ax+1.5y+2z)}$;

$M(I)_w M(III)_x Si_y P_z O_{(0.5w+0.5ax+2y+2.5z)}$;

$M(I)_w M(III)_x Si_y B_z O_{(0.5w+0.5ax+2y+1.5z)}$;

$M(I)_w M(IV)_x Si_z O_{(0.5w+1.5x+2z)}$;

$M(I)_w M(IV)_x Al_y Si_z O_{(0.5w+1.5x+1.5y+2z)}$;

$M(I)_w M(IV)_x Si_y P_z O_{(0.5w+1.5x+2y+2.5z)}$; and $M(I)_w M(IV)_x Si_y B_z O_{(0.5w+1.5x+2y+1.5z)}$;

wherein M(I) is hydrogen, lithium, sodium or potassium; Al is aluminum; Si is silicon; P is phosphorus; O is oxygen; B is boron; M(II) is magnesium, calcium, strontium, or barium; M(III) is a transition metal of the first, second or third series or the actinides; M(IV) is a metal of the lanthanide series; a is the valency value of the M(III) metal; w is a value to balance the election charge created by the values of x, y, and z; and x, y, and z are each independently a value from about 0.1 to about 10.0.

Preferably the soluble metal salt is a salt with a metal moiety selected from magnesium, iron, copper, zinc, zirconium, ytterbium, lanthanum and cerium; more preferably from copper, iron, zinc, zirconium, and aluminum; most preferably iron, zinc, zirconium and aluminum. The metal salt is selected preferably from $MgCl_2$, $FeCl_3$, $CuCl_2$, $ZnCl_2$, $ZnSO_4$, $Fe_2(SO_4)_3$, $ZrOCl_2$, $YCl_3$, $LaCl_3$, and $(NH_4)_2Ce(SO_4)_3$.

The silicates, phosphates and borates useable can be any type and can be represented by the general moiety empirical formula $SiO_x$, $PO_x$ and $BO_x$ wherein x ranges in value to provide know compounds or compounds produceable by the art. Such silicates, phosphates and borates moieties can be a part of compounds having various characteristics, such or being soluble or insoluble in liquids.

In one preferred embodiment the silicate is an aluminosilicate, an aluminophosphatosilicate, or an aluminoboratosilicate. The silicate can be a hydrated form and, although the degree of hydration is relatively immaterial, in another preferred embodiment the silicate is prepared by the reaction of a meta-silicate, that is a silicate with the moiety $SiO_3^{-2}$, more preferably sodium meta-silicate, such as that made by reacting sand with sodium hydroxide and sodium carbonate. Ortho-silicates can likewise be used.

Another embodiment of the present invention is a method for controlling drainage and retention in the formation of a paper matrix comprising the steps of (1) admixing a first amount of a soluble metal salt and a second amount of one or more components selected from silicates, phosphates and borates, to form a reaction product;

(2) admixing the reaction product, a polymer, and a paper furnish to produce a modified paper furnish;

(3) retaining and/or draining a portion of the modified paper furnish on a paper machine wire to form a paper matrix;

(4) measuring the amount of retaining of fibers, fines and other desired solids in and/or draining of water from the modified paper furnish as the paper matrix is formed; and, (5) on the basis of the measuring of the amount of retaining and/or draining, adjusting the first amount of the soluble metal salt and/or the second amount of the one or more components selected from silicates, phosphates, and borates to effect a desired change in the amount of retaining and/or draining.

Preferably the metal salt and the component selected from silicates, phosphates and borates are reacted to form the reaction product of step (1) before exposure to the paper furnish or polymer in steps (2), but need not be. For example, the metal salt and silicate, phosphate, and/or borate components or the reaction product thereof could be admixed simultaneously with either the furnish and/or the polymer. This admixing the metal salt; silicate, phosphate and/or borate component; reaction product; paper furnish; and polymer can be performed in a variety of sequences at one of several addition points for a paper machine or in process lines entering a paper machine to produce the modified paper furnish. For instance, the admixing of either the paper furnish or the polymer may be done with the reaction product before the addition of the other. The invention likewise includes an optional step of recycle of a portion of the paper machine product to the process. Such recycled material can be the source of one of the above components in the various steps. As a further example of the variation in the sequence of the steps or parts thereof, in one embodiment, the polymer and the paper furnish in step (2) are pre-mixed together before the addition of the reaction product of step (1). In another embodiment, the reaction product of step (1) and the paper furnish in step (2) are pre-mixed before the addition of the polymer. In yet another embodiment, all three components of the reaction product, the polymer, and the paper furnish are simultaneously admixed. Other variations of mixing and points of addition can be used to create the modified paper furnish of step (2).

The polymer useable in step (2) are those polymers typically used in paper making systems and which act as aids to flocculation. Preferably, the polymer is a synthetic organic polymer, e.g. a polyelectrolyte (anionic, cationic, or ampholytic) or a nonionic polymer and contains one or more type of structural repeating units. For example, a homopolymer, copolymer or terpolymer; but not limited to only three differing types of structurally repeating units. Variation in the polymer can occur so that a distribution of polymer molecules may be present within the "polymer". The polymer may be initially supplied in a variety of forms, such as powder, granules, aqueous solutions, gels, and emulsions. Preferred among the nonionic polymers are poly (acrylamide) and poly(ethylene oxide). Preferred among the anionic polymers are carboxyl group containing polymers and sulfonic acid group containing polymers. Preferred among the cationic polymers dialkylamino alkyl acrylic and methacrylic ester polymers, N-(dialkylamino alkyl) acrylamide polymers, carbamoyl polymers, poly (diallyldimethylammonium chloride) polymers, poly (hydroxyalkylene polyamines) polymer, poly (ethyleneimine) polymers, and cyanamide derivative polymers. Preferred polyampholytic include those which are copolymers of the above cationic, anionic and ionic moieties, and can have amphoteris character.

In yet another preferred method, the reaction product of step (1) is milled or dispersed to a desired size before admixing with the paper furnish.

The preferred materials are as those listed herein above. The process is usable in either an acid or alkaline papermaking process. In a typical paper-making process, the x, y, and z values for the empirical formulas listed above will range from about 0.1 to about 10.0, and the ratio of x:y:z is customized or optimized for a particular operating condition and can change as the process conditions change.

In paper systems containing starch a sodium metal silicate is preferred. In white paper systems in which starch is an additive sodium zinc silicate is a more preferred microparticle. In brown paper systems in which starch is an additive sodium iron silicate is a more preferred microparticle.

Optional embodiments include steps wherein the other desired solids in step (4) above include fillers, such as calcium carbonate; recycled material, such as paper machine broke; and/or pigments.

In another embodiment, the present invention is a method for treating water comprising the steps of (1) admixing a first amount of a soluble metal salt and a second amount of one or more components selected from silicates, phosphates and borates, to form a reaction product; and (2) admixing the reaction product and water comprising a polymer to produce water comprising floccule.

The following optional steps may be performed:

(3) providing the sedimentation of the floccule in the water to produce clarified water; and/or (4) filtering the water comprising floccule to remove effectively remove the floccule.

The formed floccule act to treat the water by electrostatically binding or by physically entraining undesired materials such as solids or oils or suspensions which are desired for removal. Removal is then effected by sedimentation or filtration of the floccules. The steps may be performed sequentially or simultaneously in any combination of order. For example, in one instance effluent process water, such as from a paper mill, is treated to remove suspended fibers or other solids before discharge into the environment. The components are added to result in a floccule formation, which entraps the suspended fibers or solids in a clarifying operation. Although this example deals with a paper mill effluent process water; the invention is applicable to incoming mill water to remove naturally present solids or to process any water stream where clarification is desired.

The following examples serve to illustrate, but not limit, the scope and definition of the present invention.

EXAMPLE 1

Magnesium Silicate

Seventy five (75) grams of a 0.1 molal aqueous sodium meta-silicate solution ($Na_2SiO_3.5H_2O$) was added to a 200 milliliter beaker equipped with a magnetic stir bar. Seventy five (75) grams of a 0.1 molal aqueous solution of $MgCl_2$ was then rapidly added to the stirring meta-silicate solution. These reactants were at ambient temperature. The mixture was stirred for one minute after which the reaction was terminated. The reaction results in a cloudy, white slurry containing magnesium silicate microparticles.

EXAMPLE 2

Zinc Silicate

Fifty (50.0) grams of a 0.1 molal aqueous sodium meta-silicate solution ($Na_2SiO_3.5H_2O$) was added to a 200 milliliter beaker equipped with a magnetic stir bar. Fifty (50.0) grams of a 0.1 molal aqueous solution of $ZnCl_2$ was then rapidly added to the stirring meta-silicate solution. The reactants were at ambient temperature. The mixture was stirred for one minute after which the reaction was terminated. The reaction results in a cloudy, white slurry containing zinc silicate microparticles. Chemical analysis on the resulting precipitate by x-ray fluorescence revealed the predominate product to be $Zn_{1.0}Si_{1.0}O_{3.0}$.

EXAMPLE 3

Iron Silicate

One hundred (100) grams of a 0.1 molal aqueous sodium meta-silicate solution ($Na_2SiO.5H_2O$) was added to a 200 milliliter beaker equipped with a magnetic stir bar. Sixty (60) grams of a 0.1 molal aqueous solution of $FeCl_3 \cdot 6H_2O$ was then rapidly added to the stirring meta-silicate solution. The reactants were at ambient temperature. The mixture was stirred for one minute after which the reaction was terminated. The reaction results in a cloudy, brown slurry containing iron silicate microparticles. Chemical analysis on the resulting precipitate by x-ray fluorescence revealed the predominate product to be $Na_{0.2}Fe_{0.6}Si_{1.0}O_{3.0}$.

EXAMPLE 4

Copper Silicate

One hundred (100) grams of a 0.1 molal aqueous sodium meta-silicate solution ($Na_2SiO_3 \cdot 5H_2O$) was added to a 200 milliliter beaker equipped with a magnetic stir bar. Seventy (70) grams of a 0.1 molal aqueous solution of $CuCl_2 \cdot 2H_2O$ was then rapidly added to the stirring meta-silicate solution. The reactants were at ambient temperature. The mixture was stirred for one minute after which the reaction was terminated. The reaction results in a cloudy, blue slurry containing copper silicate microparticles. Chemical analysis on the resulting precipitate by x-ray fluorescence revealed the predominate product to be $Cu_{1.15}Si_{1.0}O_{3.15}$.

EXAMPLE 5

Zirconium Silicate

One hundred (100) grams of a 0.1 molal aqueous sodium meta-silicate solution ($Na_2SiO_3 \cdot 5H_2O$) was added to a 200 milliliter beaker equipped with a magnetic stir bar. Sixty (60) grams of a 0.1 molal aqueous solution of $ZrOCl_2 \cdot 8H_2O$ was then rapidly added to the stirring meta-silicate solution. The reactants were at ambient temperature. The mixture was stirred for one minute after which the reaction was terminated. The reaction results in a cloudy, white slurry containing zirconium silicate microparticles. Chemical analysis on the resulting precipitate by x-ray fluorescence revealed the predominate product to be $Na_{0.4}Zr_{0.63}Si_{1.0}O_{3.5}$.

EXAMPLE 6

Lanthanum Silicate

One hundred (100) grams of a 0.1 molal aqueous sodium meta-silicate solution ($Na_2SiO_3 \cdot 5H_2O$) was added to a 200 milliliter beaker equipped with a magnetic stir bar. Fifty (5) grams of a 0.1 molal aqueous solution of $LaCl_3 \cdot 7H_2O$ was then rapidly added to the stirring meta-silicate solution. The reaction was terminated. The mixture was stirred for one minute after which the reaction was terminated. The reaction results in a cloudy, white slurry containing lanthanum silicate microparticles. Chemical analysis on the resulting precipitate by x-ray fluorescence revealed the predominate product to be $La_{0.62}Si_{1.0}O_{2.92}$.

EXAMPLE 7

Yttrium Silicate

One hundred (100) grams of a 1.0 molal aqueous sodium meta-silicate solution ($Na_2SiO_3 \cdot 5H_2O$) was added to a 200 ml beaker equipped with a magnetic stir bar. Fifty (50) grams of a 0.1 molal aqueous solution of $YCl_3 \cdot 6H_2O$ was then rapidly added to the stirring meta-silicate solution. The reactants were at ambient temperature. The mixture was stirred for one minute after which the reaction was terminated. The reaction results in a cloudy, white slurry containing yttrium silicate microparticles. Chemical analysis on the resulting precipitate by x-ray fluorescence revealed the predominate product to be $Y_{0.62}Si_{1.0}O_{2.93}$.

EXAMPLE 8

Copper Aluminosilicate

To a 200 ml beaker equipped with a magnetic stirrer was added 50 grams of a 0.1 molal aqueous solution of $CuCl_2 \cdot 2H_2O$. While stirring the previously described solution 20 grams of 0.1 molal aqueous solution of $Al_2(SO_4)_3$ was added. After stirring one minute 100 grams of a 0.1 molal aqueous solution of $Na_2SiO_3 \cdot 5H_2O$ was quickly added. The slurry was stirred for an additional one minute after which the reaction was terminated. The reaction resulted in a cloudy, blue slurry containing the precipitated copper aluminosilicate microparticles. Chemical analysis by x-ray fluorescence revealed the predominate product to be $Cu_{0.46}Al_{0.40}Si_{1.0}O_{3.1}$.

EXAMPLE 9

Zinc Aluminosilicate

Sixty-five (65) grams of a 0.1 molal aqueous solution of $ZnCl_2$ was added to a 200 milliliter beaker equipped with a magnetic stirrer. While stirring the previously described solution twenty (20) grams of a 0.1 molal aqueous solution of $Al_2(SO_4)_3$ was added. After stirring one minute one hundred (100) grams of a 0.1 molal aqueous solution of $Na_2SiO_3 \cdot 5H_2O$ was quickly added. The slurry was stirred for an additional one minute after which the reaction was terminated. The reaction resulted in a cloudy, white slurry containing the precipitated zinc aluminosilicate microparticles product. Chemical analysis by x-ray fluorescence revealed the predominate product to be $Zn_{0.42}Al_{0.42}Si_{1.0}O_{3.0}$.

EXAMPLE 10

Retention Aids

Products of examples 2 through 9 were evaluated as microparticle retention aids using standard Britt Jar techniques as described hereinafter. Commercially available microparticle retention aids (Allied Colloids' Hydrocol® O bentonite and PSM-Particol® B. Silica microgel) were used as controls. The paper furnish used was a blend of 60% hardwood kraft and 40% softwood kraft and was filled with 30% precipitated calcium carbonate. The total furnish solids were 0.5 weight percent consistency. The furnish had a measured pH of 8.5. A polymer flocculent, Allied Colloids' Percol® 175 polyacrylamide (a medium molecular weight, cationic polyacrylamide), was added to the furnish and the stir rate was increased to 2000 rpm. After 30 seconds the stir rate was decreased to 750 rpm. After 10 seconds the microparticle retention aid was added. Ten seconds later, the jar was drained and the first 100 ml was collected and analyses performed for calcium carbonate retention using standard EDTA titration techniques. Table 1 lists the performance of each microparticle with respect to filler retention.

TABLE 1

| Microparticle | % Filler Retention |
| --- | --- |
| Polymer only | 16 |
| Zinc Silicate (Ex. 2) | 75 |
| Iron Silicate (Ex. 3) | 64 |
| Copper Silicate (Ex. 4) | 63 |
| Zirconium Silicate (Ex. 5) | 67 |
| Lanthanum Silicate (Ex. 6) | 52 |
| Yttrium Silicate (Ex. 7) | 63 |
| Copper Aluminosilicate (Ex. 8) | 67 |
| Zinc Aluminosilicate (Ex. 9) | 71 |
| Hydrocol ® O bentonite | 69 |
| PSM-Particol ® B. Silica microgel (2#/Ton) | 55 |

For each experiment the polymer flocculent was dosed at 1 lb/ton and the microparticle was dosed at 4 lbs./ton.

EXAMPLE 11

Fifty (5) grams of a 0.1 molal aqueous solution of sodium meta-silicate ($Na_2SiO_3.5H_2O$) was added to a 200 milliliter beaker equipped with a magnetic stirrer. While stirring the previously described solution, 35 grams of a 0.1 molal aqueous solution of $Na_3PO_4.12H_2O$ was added. After stirring one minute, 80 grams of a 0.1 molal aqueous solution of $ZnSO_4.7H_2O$ was quickly added. The slurry was stirred for an additional one minute after which the reaction was terminated. To another 200 ml beaker equipped with a magnetic stirrer was added 50 grams of a 0.1 molal aqueous solution of $Na_2SiO_3.5H_2O$. While stirring the previously described solution, 12.5 grams of a 0.1 molal aqueous solution of $Na_2B_4O_7.10H_2O$ was added. After stirring one minute, 80 grams of a 1.0 molal aqueous solution of $ZnSO_4.7H_2O$ was quickly added. The slurry was stirred for an additional one minute after which the reaction was terminated.

The above reactions resulted in cloudy, white slurries containing microparticle products of zinc phosphatosilicate and zinc boratosilicate, respectively. Each microparticle was then evaluated in Britt Jar experiments under conditions identical to those listed in Example 10. The results of these evaluations are listed in Table 2.

TABLE 2

| Microparticle | % Filler Retention |
| --- | --- |
| polymer only | 18 |
| zinc phosphatosilicate (ex. 10) | 65 |
| zinc boratosilicate (ex. 10) | 55 |

The polymer flocculent was Allied Colloids Percol® 175 (cationic medium molecular weight polyarcylamide) dosed at 1 lb/ton. The microparticle is dosed at 4 lbs/ton.

EXAMPLE 12

The products of Examples 2 through 7 were evaluated as microparticle retention aids using standard Britt Jar techniques as described in Example 10, but using a clay filled acid paper making furnish. The papermaking furnish consisted of a kraft fiber blend of 60 percent hardwood and 40 percent softwood. The papermaking furnish contained 30 percent calcined clay (Ansilex®, produced by Engelhard Corporation) and total furnish solids was 0.5 percent. Allied Colloids Hydrocol® O bentonite was included as a control.

The polymer portion of the retention system consisted of Allied Colloids' Percol® 368 DADMAC coagulant and Percol® 175 polyacrylamide flocculent. The Percol® 368 was required to neutralize the highly anionic clay. Retention aid dosages for all runs were 2 lbs./ton, 2 lbs./ton and 6 lbs./ton for the Percol® 368, Percol® 175, and microparticle respectively. The results of the evaluations are listed in Table 3.

TABLE 3

| Microparticle | % of Filler Retention |
| --- | --- |
| None | 28 |
| Zinc Silicate (Ex. 2) | 63 |
| Iron Silicate (Ex. 3) | 59 |
| Copper Silicate (Ex. 4) | 59 |
| Zirconium Silicate (Ex. 5) | 65 |
| Lanthanum Silicate (Ex. 6) | 46 |
| Yttrium Silicate (Ex. 7) | 59 |
| Hydrocol ® O bentonite | 71 |

EXAMPLE 13

Water Clarification

A 10,000 gallon reservoir of water with solids in suspension is dosed with 0.1 to 10 pounds of a polyacrylamide flocculant. Such dosing can be performed by mechanical mixing or injection of the flocculant with singular or multiple points of injections. Additional agitation could be performed. The zinc silicate product of Example 2 is then added to the reservoir at a dosage of 0.1 to 10 pounds. Additional or continuing means of mixing or dispersion can be performed. Flocculation of the solids in suspension occurs. The flocculated solids are allowed to settle and the solids in suspension with the water is reduced.

The procedure herein is performed using separately, or in combination, the products of Examples 2 through 9.

The foregoing description has been provided for the purpose of illustrating the preferred embodiments of the invention. Such illustrations are not to be interpreted as a limitation of the scope of the present invention.

What is claimed is:

1. A method for treating water comprising the steps of
(1) precipitating a microparticle product by the admixing of a soluble meal salt selected from the group consisting of magnesium, iron, copper, zinc, zirconium, yttrium, lanthanum and cerium and one or more compounds having a component selected from the group consisting of silicates, phosphates and borates wherein said product is represented by an empirical formula selected from the group consisting of $$M(I)_wAl_xSi_yP_zO_{(0.5w+1.5x+2y+2.5z)};$$

$$M(I)_wAl_xSi_yB_zO_{(0.5w+1.5x+2y+1.5z)};$$

$$M(I)_wM(II)_xAl_ySi_xO_{(0.5w+x+1.5y+2z)};$$

$$M(I)_wM(III)_xAl_ySi_zO_{(0.5w+0.5ax+1.5y+2z)};$$

$$M(I)_wM(IV)_xAl_ySi_zO_{(0.5w+1.5x+1.5y+2z)};$$

wherein M(I) is hydrogen, lithium, sodium or potassium; Al is aluminum; Si is silicon; P is phosphorus; O is oxygen; B is boron; M(II) is magnesium, calcium, strontium, or barium; M(III) is a transition metal of the first, second or third series or the actinides; M(IV) is a metal of the lanthanide series; a is the valency value of the M(III) metal; w is a value to balance the election charge created by the values of x, y and z; and x, y, and z are each independently a value from about 0.1 to about 10.0; and (2) admixing the microparticle product and water comprising a polymer to produce water comprising floccule.

2. The method of claim 1 further comprising the steps of (3) providing the sedimentation of the floccule in the water to produce clarified water; and/or (4) filtering the water comprising the floccule to effectively remove the floccule.

* * * * *